United States Patent [19]

Dickinson

[11] 3,897,955

[45] Aug. 5, 1975

[54] ADJUSTABLE STYLUS ASSEMBLY

[75] Inventor: George R. Dickinson, Norridge, Ill.

[73] Assignee: Zenith Radio Corporation, Chicago, Ill.

[22] Filed: Oct. 24, 1974

[21] Appl. No.: 517,692

[52] U.S. Cl. .................................................. 274/37
[51] Int. Cl.[2] .................................................. G11B 3/02
[58] Field of Search .................................................. 274/37, 38

[56] References Cited

UNITED STATES PATENTS

| | | | |
|---|---|---|---|
| 2,067,347 | 1/1937 | Rysick | 274/38 |
| 2,511,664 | 6/1950 | Bachman | 274/37 |
| 2,543,655 | 2/1951 | Balmer et al. | 274/38 |
| 3,328,038 | 6/1967 | Cavagnaro | 274/37 |
| 3,691,317 | 9/1972 | Dickopp | 178/6.6 A |
| 3,783,196 | 1/1974 | Stanley | 274/38 |
| 3,803,351 | 8/1972 | Pedersen et al. | 274/1 D |
| 3,858,889 | 1/1975 | Hagenah | 274/37 |

*Primary Examiner*—Richard E. Aegerter
*Assistant Examiner*—John W. Shepperd
*Attorney, Agent, or Firm*—Cornelius J. O'Connor

[57] ABSTRACT

An adjustable stylus assembly for optimizing the output of a stylus while maintaining a predetermined contact pressure between the stylus and the groove of a video disc irrespective of the angle of attack of the stylus relative to the groove. A mounting head is provided having a curved bearing surface and a rotatably driver which frictionally captivates therebetween the driven portion of a stylus support arm. This driven portion has a curvature corresponding to that of the bearing surface so that, as the stylus is displaced along the bearing surface to adjust the stylus angle of attack, the stylus remains at the effective center of curvature of the bearing surface insuring that the contact pressure between the stylus and the groove remains substantially constant.

3 Claims, 6 Drawing Figures

Fig.1.
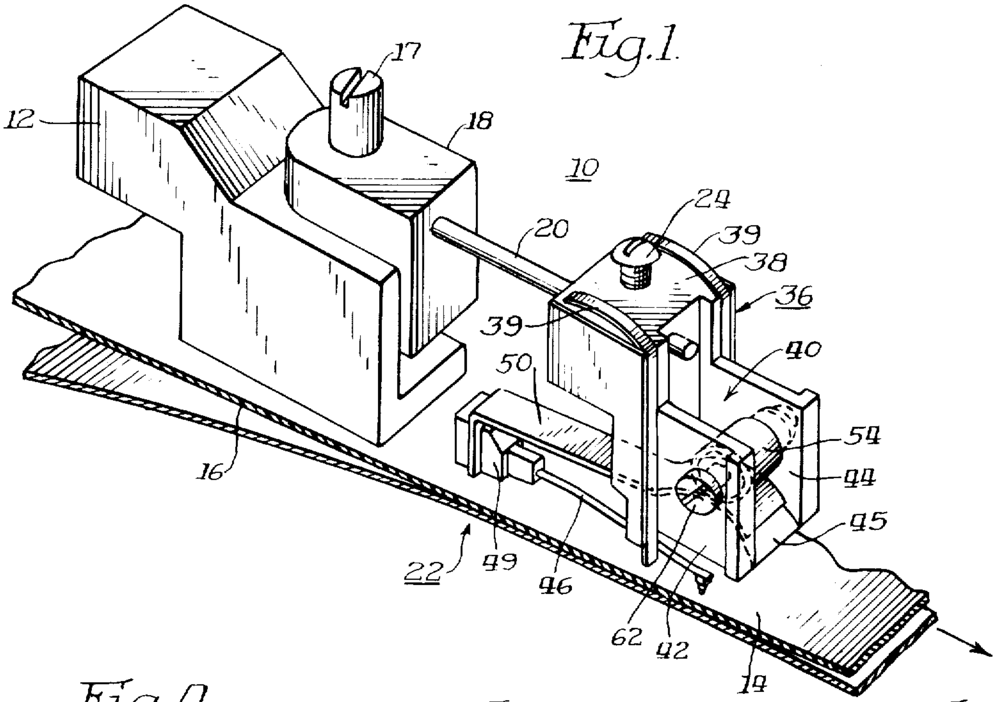
Fig.4.
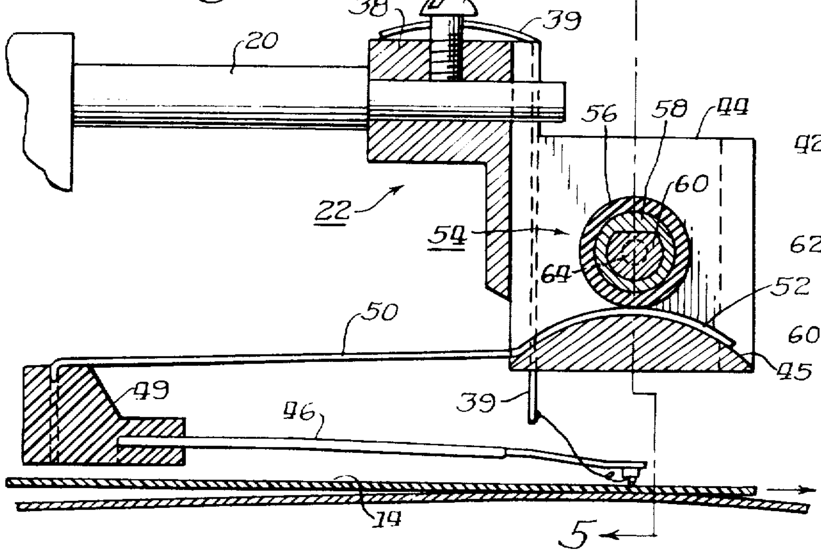
Fig.5.
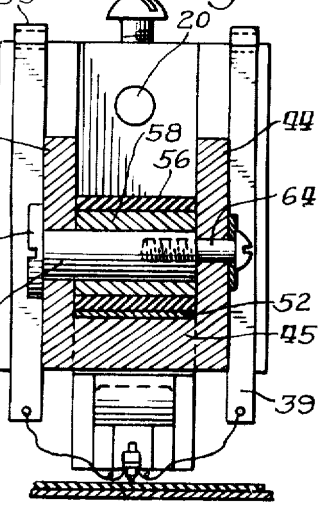
Fig.2 Fig.3a. Fig.3b.
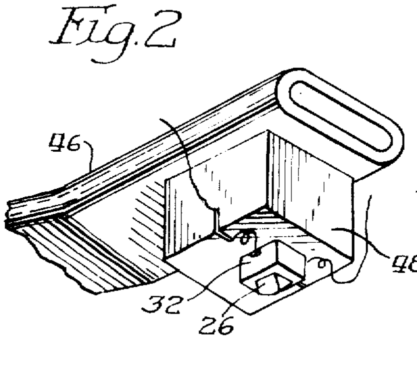
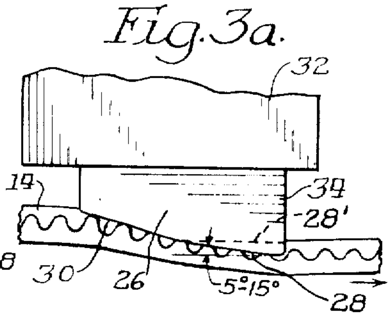
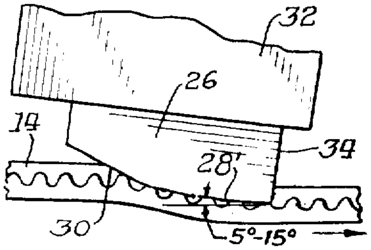

ADJUSTABLE STYLUS ASSEMBLY

BACKGROUND OF THE INVENTION

This invention relates in general to playback apparatus for retrieving video information stored on a record disc and in particular to an adjustable stylus assembly for use with such apparatus.

In one type of video record the disc is comprised of a flexible material and the information is stored in the form of undulations formed in a spiral groove applied to the surface of the disc. These undulations, in effect, constitute a spatial representation of the time variations of the stored information. The information is retrieved by a stylus assembly comprising a tracking element or stylus which is coupled to a pressure responsive transducer, for example, a piezoelectric device. The stylus is precisely fitted to the groove and arranged to apply sufficient pressure upon the undulations to compress them as they pass under the stylus.

In the subject type of video disc system the release of the compressed undulations as they emerge from under the stylus causes the stylus to transmit forces to the transducer which translates the pressure differentials applied thereto into electrical signals. A pressure responsive video disc playback system of this type is described in U.S. Pat. No. 3,691,317. In practice, it has been found that if the tracking surface, or ridge of the stylus is canted to present a sloping profile to the undulations, stylus tip wear is reduced. However, it has also been determined that the force transmitted by the stylus to the transducer is a maximum when the trailing edge of the stylus tip is substantially vertical to the groove surface.

The problem then is to adjust the angle of attack of the stylus ridge to obtain maximum output from the stylus assembly while compensating for stylus tip wear. However, since the dimensions of the stylus and the groove undulations are in the order of microns it is impossible to actually see the tip of the stylus or the groove undulations or to measure the angle of attack of the stylus relative to the groove. Accordingly, it has now been determined that a particularly feasible method of insuring proper stylus orientation relative to the groove, without damaging groove undulations, is in the use of an external stylus control which can be adjusted during actual playback of the disc, thus affording instantaneous observation of reconstituted video information as an indicator of correct stylus angle of attack.

In another type of video disc the groove is again provided with undulations constituting a spatial representation of the time variations of a recorded signal, but in this case, the information is retrieved by a sensing element comprising a capacitive probe. Such a probe comprises a stylus tip having a conductive electrode affixed thereto and dimensioned to track within the groove. In one approach the record surface beneath the groove is formed of a conductive material that constitutes a reference or ground plane. During playback of such a disc, as the probe is tracked along the groove, the undulations passing beneath the probe are reflected as changes in the amount of dielectric material interposed between the probe and the reference plane, thus giving rise to capacitance variations as the groove is monitored by the probe. A capacitive playback system of this type is described in U.S. Pat. No. 3,783,196.

As in the mechanical system initially described, it is important also in a capacitance type pickup that a preferred angle of attack of the probe relative to the groove be established to assure a maximum output from the stylus. Again, as in the mechanical system, the dimensions of the capacitive type probe and the groove geometry are such that it is extremely difficult, if not impossible, to establish the aforementioned angle of attack with the naked eye.

OBJECTS OF THE INVENTION

It is, therefore, an object of this invention to provide an improved stylus assembly for use with a video disc record.

It is a specific object of this invention to provide an adjustable stylus assembly for use with video disc records.

It is still another object of this invention to provide an adjustable stylus assembly which permits adjusting the stylus angle of attack during retrieval of information from a video disc.

SUMMARY OF THE INVENTION

In accordance with the invention an adjustable stylus assembly for optimizing the output of a stylus while maintaining a predetermined contact pressure between the stylus and the information bearing track of a record, irrespective of the angle of attack of the stylus relative to the track, comprises a stylus and a mounting head which includes a bearing surface having a predetermined curvature and which further includes an adjustable driver disposed adjacent to the bearing surface. The stylus is supported by means comprising a driven portion having a curvature which corresponds substantially to that of the bearing surface. This driven portion is interposed between the bearing surface and the driver. The stylus supporting means further includes a member coupled to the aforesaid driver portion for positioning the stylus at a location that corresponds substantially to the effective center of curvature of the bearing surface. Finally, means are provided for adjusting the driver to displace the driven portion of the stylus supporting means along the bearing surface of the mounting head to establish a desired angle of attack for the stylus while maintaining the spacing between the stylus and the bearing surface substantially constant and, thereby, the predetermined contact pressure between the stylus and the track.

BRIEF DESCRIPTION OF THE DRAWINGS

The features of the present invention which are believed to be novel are set forth with particularity in the appended claims. The invention, together with further objects and advantages thereof, may best be understood by references to the following description taken in conjunction with the accompanying drawings, in the several figures of which like reference numerals identify like elements, and in which:

FIG. 1 is a perspective view of an adjustable stylus assembly constructed in accordance with the invention;

FIG. 2 is an enlarged perspective view of the stylus portion of the FIG. 1 assembly;

FIGS. *3a* and *3b* are sideviews of a stylus pickup element illustrating the manner in which the stylus engages the undulations in a video disc groove;

FIG. 4 is a sideview, partly in section of the stylus assembly shown in FIG. 1; and FIG. 5 is a sectional view taken along lines 5—5 in FIG. 4.

DESCRIPTION OF THE PREFERRED EMBODIMENT

The stylus pickup carriage assembly 10 shown in FIG. 1 can be employed in a video disc playback deck of the type described in U.S. patent application Ser. No. 277,074, filed Aug. 1, 1972, entitled "Carriage Assembly for a Video Disc Playback Deck" now U.S. Pat. No. 3,852,816 and assigned to the same assignee as the subject invention. That application describes in detail the manner in which a pickup assembly of the type herein considered is supported above and tracked across the surface of a rotating video disc to retrieve the video information stored thereon.

The assembly of FIG. 1 comprises a carriage arm 12 which is supported for travel in a direction transverse to the spiral information bearing track 14 which, in the case at hand, constitutes a groove formed on the surface of a video disc record 16. The manner in which such a disc is driven, or flown, is described in U.S. Pat. No. 3,803,351 which is also assigned to the same assignee as the subject invention. For reasons having to do with the geometry of the stylus, the disc will be assumed to be traveling in the direction indicated by the double-headed arrow. Affixed to arm 12 by a fastener 17 is a block 18 that is tapped to fixedly secure a support rod 20 which serves to suspend an adjustable stylus assembly 22 in a tracking relation to disc 16. While it may not be readily apparent from the drawings, the record disc, while being flown, presents a curved profile when viewed from the side. It is at the apex of the record's curvature that the stylus contacts the disc. Assembly 22, which is adjustable longitudinally, as well as rotationally, upon rod 20, is secured in a selected position and orientation to the disc by a set screw 24.

Assembly 22 comprises a sensing element or stylus 26 which preferably takes the form of a wedge manufactured from a gem material, e.g., diamond, sapphire, etc., see FIGS. 2, 3a and 3b, configured to track within the spiral groove of a video disc. The latter two drawings depict a longitudinal section through a portion of groove 14 with stylus 26 in engagement with and compressing a plurality of undulations. To this end stylus 26 comprises a slightly tapered skid portion 28 leading to a moderately sloping leading edge 30 which initially encounters the groove undulations as the groove is driven under the stylus. Desirably, the taper of skid 28 relative to a horizontal plane, as viewed in FIG. 3*a*, is in the order of 5° to 15° while the slope of edge 30 to the horizontal may be 15° to 30°. The aforementioned taper of skid 28 constitutes the angle of attack of the stylus relative to the groove. The purpose of the sloping edge, of course, is to effect a relatively low friction transition between the groove undulations and skid 28 and they may reduce stylus wear. The stylus is bonded or otherwise mechanically coupled to a pressure sensitive transducer such as a piezoelectric crystal 32 which, in response to the resultant reaction force applied thereto by the exiting of an elastically deformed undulation from under skid 28, generates an electrical signal. The tracking of the diamond in the groove, with a consequent and continuing deformation and release of the undulations therein, serves to produce a train of forces which, when coupled to transducer 32, are converted to an electrical signal representative of the recorded information. Reference to U.S. Pat. No. 3,691,317 will disclose the manner in which, the application of an elastic restoring force to a pressure sensitive transducer serves to generate such an electrical signal.

Turning now to additional details of stylus 26, see FIGS. 3*a* and 3*b*, note that the trailing edge 34 of the stylus is disposed substantially perpendicular to skid portion 28 with the junction therebetween characterized by a minute radius. This construction permits a rapid exiting or release of a compressed undulation thus ensuring generation of maximum force for transmittal to the piezoelectric. However, unavoidable wear of the stylus does take place so that, in time, the groove contacting surface of skid 28 wears in the manner indicated by the broken line 28'. As a result of this kind of wear it will be noted, see FIG. 3*a*, that as the undulations pass under the skid toward trailing edge 34, there is a gradual reduction of compressive force upon an undulation as it approaches edge 34. Accordingly, when a now partially compressed undulation exists from under the worn skid surface 28', the reaction force available from that undulation for application to transducer 32 is significantly reduced. As a consequence, the amplitude of the electrical signal generated by the transducer is correspondingly reduced. It is to a compensation of such wear that the adjustable stylus assembly, now to be detailed, is addressed.

To this end assembly 22 comprises a mounting head 36 having an upright portion 38 for receiving rod 20, as well as for supporting a pair of terminals 39 connected to transducer 32, and a forwardly extending open housing 40 comprising side walls 42, 44. A bearing surface 45, having a predetermined curvature, extends between walls 42, 44 and forms the bottom closure of the housing.

The means for supporting stylus 26 comprises a generally U-shaped arrangement that includes a boom 46 terminated at one end by a damping pad 48 to which transducer 32 and stylus 26 are affixed, see FIG. 2. A coupler 49 of resilient material forms the bight of the U in that it receives that end of boom 46 remote from the stylus, as well as one end of a support arm 50. The opposite end of arm 50 comprises a driven portion 52 which has a curvature corresponding substantially to that of bearing surface 45. As best seen in FIG. 4, driven portion 52 is interposed between bearing surface 45 and an adjustable driver 54 which is detailed below. The lengths of arm 50 and boom 46, as well as the geometry and resiliency of coupler 49, are selected to the end that when carriage arm 12 is lowered to permit stylus 26 to engage a groove with a predetermined contact pressure, the stylus will be physically located at the exact center of curvature of bearing surface 45. In other words, the distance from the position occupied by the stylus when it is in engagement with a groove to any point on the surface of bearing 45 corresponds to the radius of curvature for surface 45.

The driver 54 for selectively adjusting the angle of attack between the stylus and the groove to optimize stylus output comprises a cylindrical roller 56 preferably formed of a resilient or, at least, friction exhibiting material. Roller 56 is rotatably supported between side walls 42, 44 of housing 40 and at a location immediately adjacent bearing surface 45 but spaced from surface 45 a distance sufficient to admit curved driven portion 52 of the support arm therebetween. Roller 56 is mounted upon a bushing 58 which can be formed of a plastic, and which includes an internally milled keyway dimensioned to snugly receive the flattened key portion of a drive pin 60 that spans side walls 42, 44 and is supported thereby. One end of pin 60 extends through wall 42 and is rotatably supported therein: see FIG. 5. That end of pin 60 is capped with a flange 62 which is slotted, or otherwise mutilated, to accommodate a driving tool or screw driver. The opposite end of pin 60 abuts side wall 44 and is internally threaded to receive a fastener 64 that extends through wall 44 to form an end bearing that rotatably captivates that end of the pin. In this fashion roller 56 of the adjustable driver is rotatably supported immediately above bearing surface 45.

As best seen in FIG. 4, curved driven portion 52 is retained in a frictional driving engagement with roller 56 so that rotation of roller 56 will serve to propel curved portion 52 along bearing surface 45 and, thereby, change the angle of attack of stylus 26 with respect to the record groove. At this juncture it is important to note that, irrespective of the extent that support arm curved portion 52 is displaced along bearing 45 to alter the stylus angle of attack, the contact pressure between the stylus and the groove will remain unchanged. This obtains because curved portion 52 of the stylus support arm has the same radius of curvature as bearing surface 45. As a result, the stylus is constrained to remain at the center of curvature of bearing 45. Accordingly, since stylus 26 is not significantly displaced, vertically or horizontally, when the stylus angle of attack is adjusted the contact pressure the stylus exerts upon the groove remains constant.

In operation carriage arm 12 is lowered to effect engagement between stylus 26 and a groove of the video disc. The output signal from transducer 48 is coupled to signal processing circuitry (not shown) which in conjunction with a television receiver reconstitutes an image from the video information retrieved from the disc. By visually observing the reproduced image on the receiver an evaluation is made respecting its detail, resolution, etc. If the image is poor, or it is determined that it can be improved upon, the operator simply inserts a screwdriver or other tool into the slotted flange 62 of the drive pin and rotates roller 56 until an improvement is noted. In essence, optimization is obtained by adjusting the angle of attack of the stylus relative to the groove. Mechanically, this is achieved by virtue of the fact that curved portion 52 of stylus support arm, being captivated between roller 56 and bearing surface 45, is effectively rotated about its center of curvature and thereby rotates stylus 26 about its contact point in the groove.

More particularly, if the drive pin is rotated in a counterclockwise direction, as viewed in FIG. 4, then curved portion 52 of the stylus support arm will be displaced along bearing surface 45 in a clockwise direction. This will have the effect of increasing the angle of attack between the stylus skid portion 28 and the record groove, that is, the stylus is rotated from its position depicted in FIG. 3*a* to the position shown in FIG. 3*b*. The practical result, then, is a rotation of flattened skid portion 28′ to the position formerly occupied by skid 28 so that skid 28′ is now substantially perpendicular to the peaks of the undulations passing thereunder. As a result skid portion 28′ now establishes the angle of attack for the stylus which, as previously mentioned is desirably between 5° and 15°. This relocation of skid 28′ has the effect of increasing the pressure upon those undulations so that, when they now exit from under its trailing edge 34, they cause a substantially greater force to be applied to transducer 32 than the force that would have been applied by undulations existing from under skid 28′ when it occupied the position shown in FIG. 3*a*. In this fashion, the output from a worn, or, for that matter, an improperly oriented, stylus is readily optimized.

Accordingly, there has been shown and described an adjustable stylus assembly for optimizing the output of a stylus while maintaining a predetermined contact pressure between the stylus and the groove irrespective of the angle of attack of the stylus relative to the groove. This obtains because rotation of the stylus, while changing its angle of attack, to the extent that one skid portion replaces another, does not displace the working skid portion from the center of curvature of bearing surface 45. Moreover, while the invention has been depicted in the environment of a pressure pickup system, the inventive teaching is equally applicable to a video reproducing system in which resort is had to a capacitance type pickup element. As noted above the invention finds particular utility in those video reproducing systems where the geometry of the discs and the pickup element are not amenable to visual adjustment and require that a relatively constant contact pressure be maintained irrespective of angular adjustments of the pickup element.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. An adjustable stylus assembly for optimizing the output of a stylus while maintaining a predetermined contact pressure between the stylus and the information bearing track of a record irrespective of the angle of attack of the stylus relative to the track, said assembly comprising:

a stylus;

a mounting head comprising a bearing surface having a predetermined curvature and further including an adjustable driver disposed adjacent said bearing surface;

means for supporting said stylus comprising a driven portion having a curvature corresponding substantially to that of said bearing surface and interposed between said bearing surface and said driver, said stylus supporting means further including a member coupled to said driven portion for positioning said stylus at a location corresponding substantially to the effective center of curvature of said bearing surface; and means for adjusting said driver to displace said driven portion of said stylus supporting means along said bearing surface to establish a desired angle of attack for said stylus while maintaining the spacing between said stylus and said bearing surface substantially constant and, thereby, said predetermined contact pressure between said stylus and said track.

2. A pickup assembly as set forth in claim 1 in which said adjustable driver comprises a rotatably supported member having a resilient sleeve disposed substantially tangent to said bearing surface to provide, in conjunction with said bearing surface, frictional retention of said driven portion of said stylus support means.

3. A pickup assembly as set forth in claim 1 in which said stylus support means comprises a substantially U-shaped arm having said driven portion located at one end of the U and said stylus at the other end of the U.

* * * * *